United States Patent [19]

Lee et al.

[11] Patent Number: 5,330,709
[45] Date of Patent: Jul. 19, 1994

[54] ZIRCONIUM-BASED HYDROGEN STORAGE MATERIALS USEFUL AS NEGATIVE ELECTRODES FOR RECHARGEABLE BATTERY

[75] Inventors: Jai Y. Lee; Soo R. Kim, both of Seoul, Rep. of Korea

[73] Assignee: Korea Advanced Institute of Science and Technology, Taijeon, Rep. of Korea

[21] Appl. No.: 12,408

[22] Filed: Feb. 2, 1993

[30] Foreign Application Priority Data

Feb. 14, 1992 [KR] Rep. of Korea ............... 92-2206

[51] Int. Cl.$^5$ ............................................... C22C 22/00
[52] U.S. Cl. .................................... 420/422; 148/421; 148/672; 423/644
[58] Field of Search ............... 148/672, 421; 423/644; 420/422

[56] References Cited

U.S. PATENT DOCUMENTS

| | | | |
|---|---|---|---|
| 4,406,874 | 9/1983 | Wallace et al. | 423/644 |
| 4,487,817 | 12/1984 | Willems et al. | 429/27 |
| 4,489,050 | 12/1984 | Van Essen et al. | 423/644 |
| 4,551,400 | 11/1985 | Sapru et al. | 429/94 |
| 4,946,646 | 8/1990 | Gamo et al. | 420/415 |
| 5,149,383 | 9/1992 | Seri et al. | 420/900 |

FOREIGN PATENT DOCUMENTS

| | | | |
|---|---|---|---|
| 0078402 | 6/1981 | Japan | 423/644 |
| 61-214360 | 10/1986 | Japan . | |
| 2-148568 | 7/1990 | Japan . | |

OTHER PUBLICATIONS

Drasner et al, Abstract J. Less-Common Metals, 163 (1990) 151–157.
C. Poinsignon et al, "Characterization of the Reversibility of TiNiH$_x$ Electrodes", Zeit. Phys. Chem. N.F. vol. 164, pp. 1515–1520 (1989).
H. Sawa et al, "Effects of Oxidation Treatment of Ti-Zr-Ni Hydride Electrodes Containing Zr$_7$Ni$_{10}$ Phase on Their Electrochemical Properties", Zeit. Phys. Chem. N.F., vol. 164, pp. 1527–1532 (1989).
S. Wakao et al, "Effects of Partial Substitution and Anodic Oxidation Treatment of Zr-V-Ni Alloys or Electrochemical Properties", Journal Less-Common Metals, vol. 172-174, pp. 1219–1226 (1991).

*Primary Examiner*—Upendra Roy
*Attorney, Agent, or Firm*—Burns, Doane, Swecker & Mathis

[57] ABSTRACT

The specification describes novel zirconium-based hydrogen storage materials useful as negative electrodes for rechargeable batteries. The materials according to the present invention are represented by the following empirical formula:

$$\text{Zr-based metal hydrides} + M_x \quad (I)$$

wherein M is a light rare earth metal selected from the group consisting of La, Nd, and Mm; $0 < x < 0.1$; and the Zr-base metal hydrides means mainly that the metal hydrides are mainly in Zr-based Laves phase such as ZrCrNi, Zr(V$_{0.33}$Ni$_{0.67}$)$_{2.4}$. Another group of the materials is represented by the following formula:

$$\text{ZrCr}_{1+y}\text{Ni}_{1+z} \quad (II)$$

wherein, $0 \leq y \leq 0.2$, and $0 \leq z \leq 0.2$, provided that y and z cannot denote 0 concurrently. The negative electrodes made of these alloys need only a small number of activation cycles and thus, exhibit an improved activation behavior without any pretreatments for the activation. The hydrogen storage materials of the invention are also featured by large discharge capacities and long cyclic life.

1 Claim, 5 Drawing Sheets

ZIRCONIUM-BASED HYDROGEN STORAGE MATERIALS USEFUL AS NEGATIVE ELECTRODES FOR RECHARGEABLE BATTERY

FIELD OF THE INVENTION

The present invention relates to novel zirconium-based hydrogen storage materials useful as negative electrodes for the rechargeable batteries.

DESCRIPTION OF THE PRIOR ART

Metal hydrides have been expected to be useful as negative. electrodes for rechargeable batteries with a high electrochemical capacity; and thus, many researches have been carried out on the metal hydride systems.

The representative examples of such researches include various metal hydride systems, for example, a La-Ni based system such as that disclosed in U.S. Pat. No. 4,487,817; an Mm(misch metal)-Ni based system such as that disclosed in Japanese Patent Application Nos. (Sho) 61-214,360 and (Hei) 2-148,568; and a Ti-Ni based system such as that disclosed in U.S. Pat. No. 4,551,400 and a paper entitled "Characterization of the Reversibility of TiNiHx Electrodes" [C. Poinsignon et al., Zeit. Phys. Chem. N.F., Vol. 164, pp. 1515-1520 (1989)]. However, the La-Ni based metal hydride system suffers from the disadvantages that the electrode capacity is significantly deteriorated in alkaline electrolytes during the charge/discharge cycle. [See J. Less Common Metals, Vol. 155, pp. 119-131 (1989), and Vol. 161, pp. 193-202 (1990).]

As an approach to overcome these disadvantages, Zr based metal hydrides have been recently developed, which retain higher hydrogen absorbing capacities and relatively good durabilities. However, the Zr based metal hydride system was found to have another disadvantage that a number of charge/discharge cycles (above 20 cycles) are necessary to have the system activated.

This disadvantage could be reduced to a certain extent by conducting an oxidation treatment under oxygen atmosphere [See, H. Sawa et al., Zeit. Phys. Chem. N. F., Vol. 164, pp. 1527-1532 (1989).]; or by conducting an anodic oxidation treatment on the particle surface. [See, "Effects of Partial Substitution and Anodic Oxidation Treatment of Zr-V-Ni alloys or Electrochemical Properties" by S. Wakao et al., J. Less Common Metals, Vol. 172-74, pp. 1219-1226 (1991).] However, the period of the preliminary charge/discharge cycles required for the activation is still long. Thus, it could be very desirous if electrode materials could be provided which need only a small number of activation cycles.

SUMMARY OF THE INVENTION

It is therefore an object of the invention to provide an electrode material which needs only a small number of activation cycles and thus exhibits an improved activation behavior.

It is another object of the invention to provide an electrode material which shows large discharge capacities and good durabilities in alkaline electrolyte.

Further objects of the invention will become apparent through reading the remainder of the specification.

These and other objects of the invention can be accomplished by providing novel Zr-based hydrogen storage materials according to the present invention in which light rare earth metals such as La, Nd, Mm, (Mm is a Misch metal which is a mixture of rare earth elements) and the like are added to Zr-based alloys in a trace amount.

DETAILED DESCRIPTION OF THE INVENTION

Figure 1:
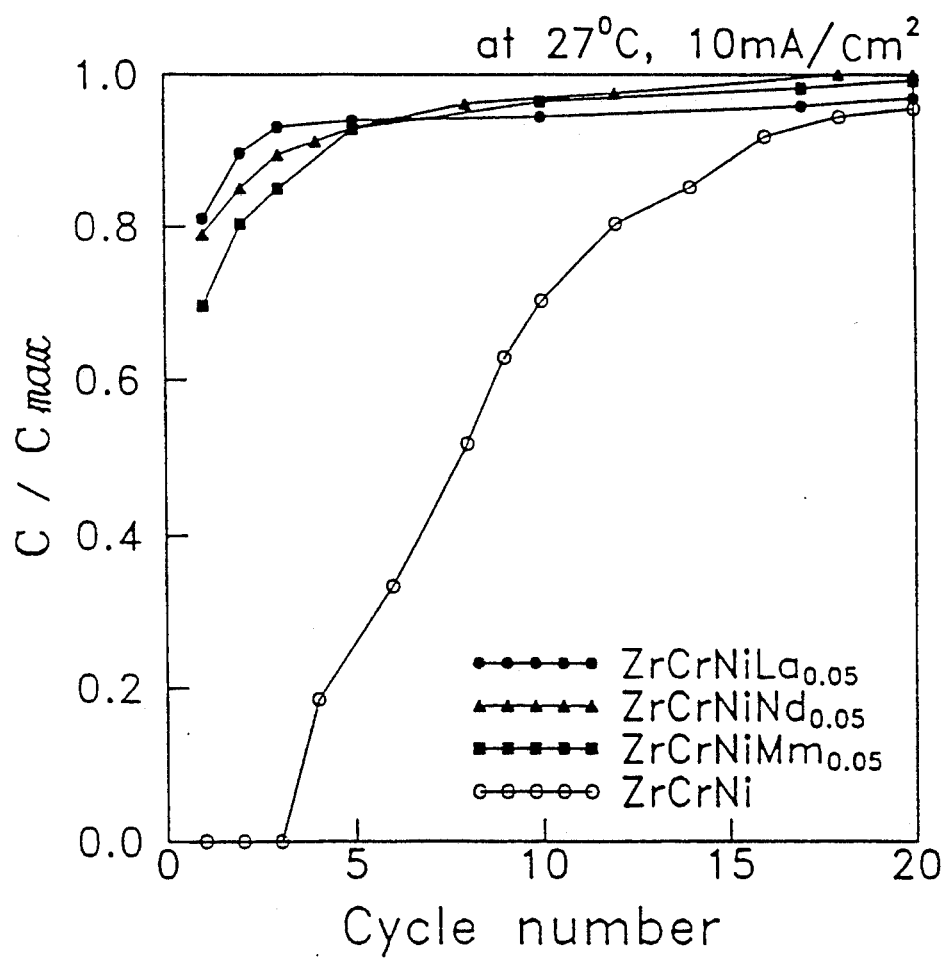
FIG. 1 is a graph showing the variations of $C/C_{max}$ of ZrCrNi and $ZrCrNiM_{0.05}$ (M=La, Nd, and Mm) electrodes with the cycle number.

According to the present invention, Zr-based hydrogen storage materials are provided. The Zr-based hydrogen storage materials are featured by easy activation behaviors (the number of activation cycles is below 5), relatively large discharge capacities (290-320 mAh/g) and long cyclic life (after 500 charge/discharge cycles, only 10% of the maximum discharge capacity is reduced).

A first group of the active materials according to the invention has a non-stoichiometric composition $(AB_{2+x})$ by adding an excess of light rare earth elements. The Zr-based hydrogen storage materials of the first group may be represented by the following empirical formula:

Zr-based metal hydrides+Mx　　(I)

wherein M is a light rare earth metal selected from the group consisting of La, Nd, Mm, etc.; $0 < x < 0.1$; and the term "Zr-based metal hydrides" means that the metal hydrides are mainly in Zr-based Laves phases such as ZrCrNi.

X-ray diffraction reveals that, in spite of the addition of an excess of light rare earth elements, the inventive materials of this type have a crystalline structure composed mainly of a single phase with a small amount of a second phase. However, in the case of $x > 0.1$, the crystalline structure is changed to multiphases. Thus, the value "x" must not exceed 0.1. Auger electron spectroscopy (AES) and X-ray photoelectron spectroscopy (XPS) of ZrCrNi alloy which is composed of zirconium oxide ($ZrO_2$), chromium oxide ($Cr_2O_3$) and metallic nickel reveal that the surface of the first group materials is composed of an excess (about 10 at%) of M-oxide (M=La, Nd, and Mm).

Among various Zr-based hydrogen storage materials belonging to the first group, the preferred are Zr-based hydrogen storage materials having the following formula:

ZrCrNiMx　　(I')

wherein M is a light rare earth metal selected from the group consisting of La, Nd, Mm, etc; and $0<x<0.1$.

A second group of the inventive materials is represented by the following formula:

$$ZrCr_{1+y}Ni_{1+z} \quad (II)$$

wherein $0 \leq y \leq 0.2$, and $0 \leq z \leq 0.2$, provided that y and z cannot denote 0 concurrently.

The Zr-based hydrogen storage materials of the second group also have a non-stoichiometric composition by adding an excess of transition metals such as Cr and Ni. X-ray diffraction of the second group materials reveals that the materials are in a second phase composed of $Cr_3Ni_2$ phase and a C14-hexagonal structure.

DESCRIPTION OF THE PREFERRED EMBODIMENTS

The present invention will be illustrated in greater detail by way of the following examples. The examples are presented for illustration purpose only and should not be construed as limiting the invention which is properly delineated in the claims.

EXAMPLE 1

In order to investigate the activation behaviors of the materials belonging to the first group, ZrCrNi having a C14-hexagonal structure were selected as the samples of the Zr-based metal hydrides. To confirm the effects of the added elements such as La, Mm and Nd, $Zr(V_{0.33}Ni_{0.67})_{2.4}$ having a C15-cubic structure were selected as the sample of the Zr-based metal hydrides.

Each sample of the non-stoichiometric alloys was prepared by using an arc melting technique under argon atmosphere. The arc melting procedure was repeated four or five times to improve the uniformity of the resulting alloys. The alloys thus obtained were crushed and ground mechanically. The powder size used in this example was below 45 μm.

The crystalline structures of the resulting alloys were investigated through X-ray diffraction. The X-ray diffraction measurement revealed that, in spite of the addition of an excess of light rare earth elements, the alloys have a crystalline structure composed mainly of a single phase with a small amount of a second phase.

The powdered alloy was mechanically mixed with nickel and polytetrafluoroethylene powders and then pressed into a pellet of 10 mm in diameter and about 1 mm in thickness to give an electrode. The oil pressure used was 5 tons/cm². To construct a working electrode, this pellet was adhered to copper rod by using silver paste. In order to construct a half cell with the working electrode, a platinum wire was used as the counter electrode, and a saturated calomel electrode as a reference electrode. The cell thus constructed was subject to charge/discharge cycles while applying DC power (5-100 mA). The discharge potential was measured and recorded by a chart recorder.

The electrodes were charged in a constant current density of 10 mA/cm² for 12 hours in a 30 wt% KOH electrolyte. And then, the discharge capacities were measured under the conditions of a constant current density of 10mA/cm at room temperature and a discharge end potential of $-0.75$ V (vs. SCE). Subsequently, the electrodes were charged and discharged galvanostically. By measuring the change of $C/C_{max}$ (C: discharge capacity=mAh/g, $C_{max}$: maximum capacity) with the number of cycles, the activation behavior of each electrodes was observed. The results are shown in FIGS. 1 and 2.

FIG. 1 is a graph showing the variations of $C/C_{max}$ of ZrCrNi and $ZrCrNiM_{0.05}$ electrodes with the cycle number. The discharge of ZrCrNi electrode was nearly zero during up to third cycles and then, increased gradually with the increase of cycles. This electrode was activated fully after at least 20 cycles. To the contrary, $ZrCrNiM_{0.05}$ electrodes having a discharge capacity of more than 200 mAh/g at the initial cycle were mostly activated within less than 5 cycles. $ZrCrNiM_{0.05}$ electrodes did not need any preliminary cycles or any pretreatments for the activation.

Figure 2:
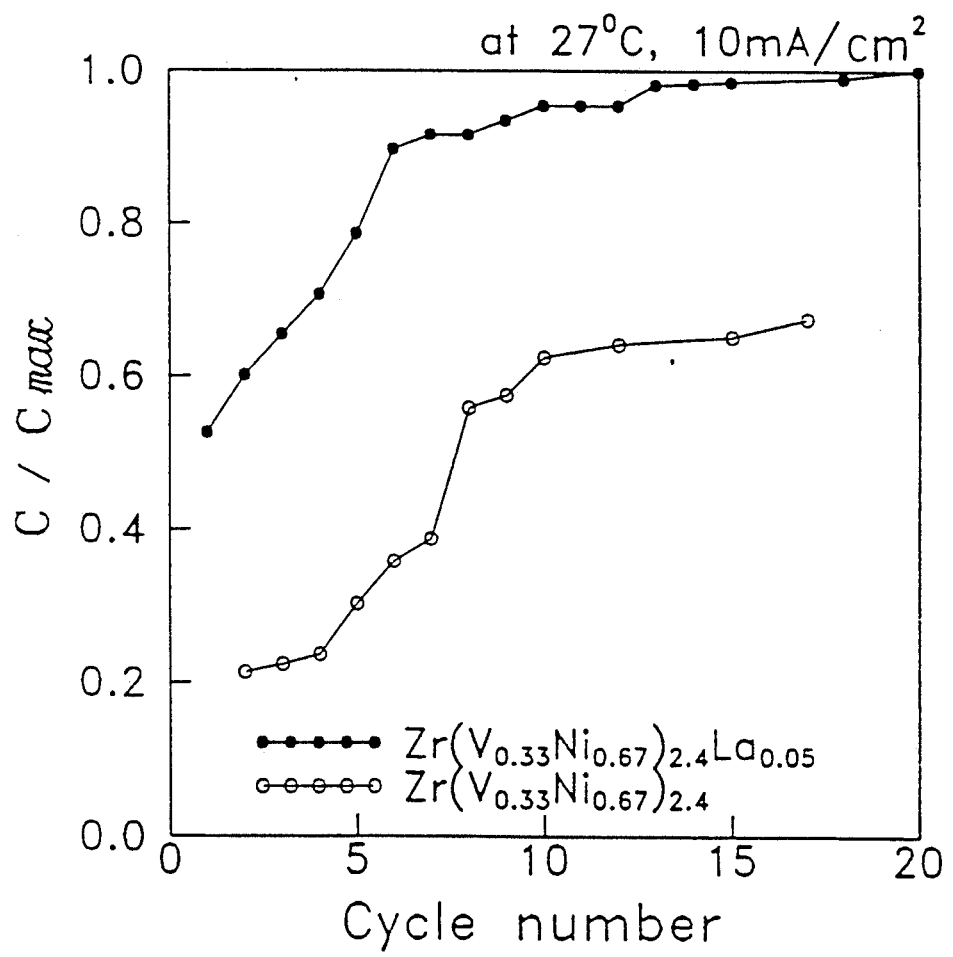
FIG. 2 is a graph showing the variations of $C/C_{max}$ of $Zr(V_{0.33}Ni_{0.67})_{2.4}$ and $Zr(V_{0.33}Ni_{0.67})_{2.4}La_{0.05}$ electrodes with the cycle . number.

FIG. 2 is a graph showing the variations of $C/C_{max}$ of $Zr(V_{0.33}Ni_{0.67})_{2.4}$ and $Zr(V_{0.33}Ni_{0.67})_{2.4}La_{0.05}$ electrodes with the passage of cycles. From this figure, it is confirmed that the $C/C_{max}$ of $Zr(V_{0.33}Ni_{0.67})_{2.4}La_{0.05}$ at each cycle is larger than that of $Zr(V_{0.33}Ni_{0.67})_{2.4}$.

These results explicitly indicate that the activation properties of Zr-based alloys can be improved by adding a trace amount of light rare earth elements.

In order to observe the cyclic properties, cyclings were done by discharging at a 0.5C rate and charging at the same rate for 2 hours at room temperature. The depth of discharge was 90%. The results are shown in FIG. 3.

Figure 3:
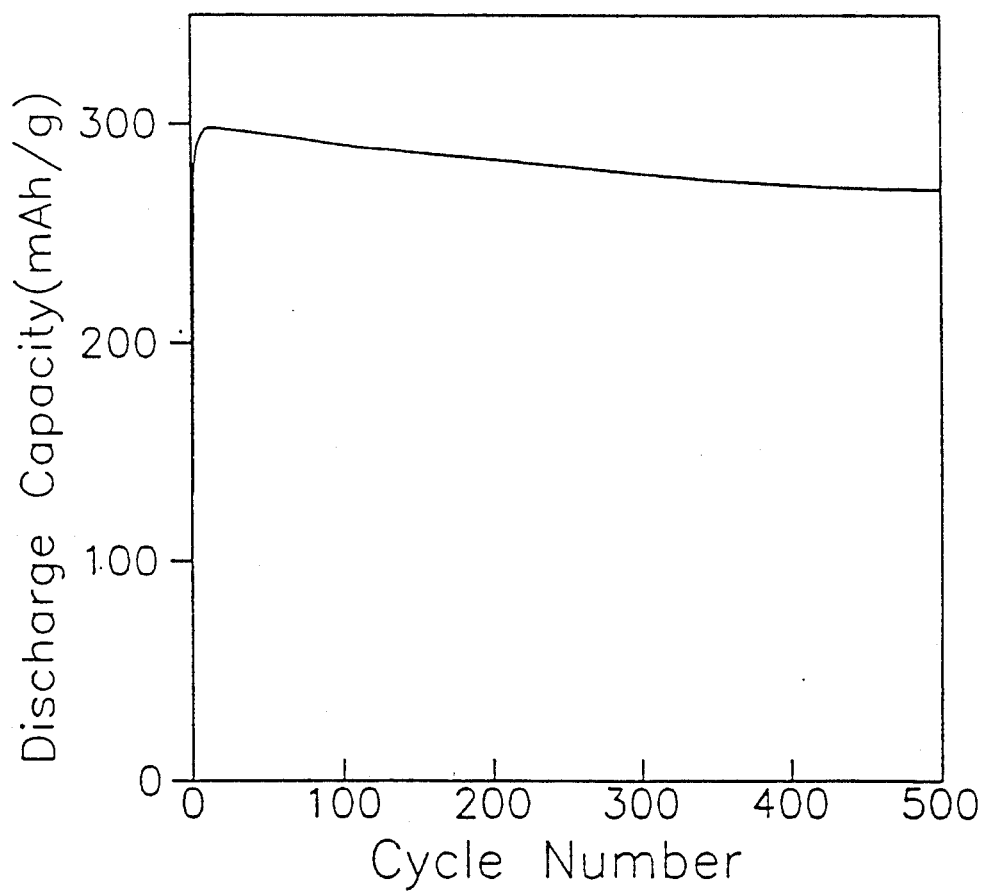
FIG. 3 is a graph showing the change of the discharge capacity of $ZrCrNiLa_{0.05}$ electrode with the extended charge/discharge cycling.

FIG. 3 shows the variations of the discharge capacity of $ZrCrNiLa_{0.05}$ electrode with the extended cycles. The discharge capacity of this sample was 320 mAh/g. After 500 cycles, the discharge capacity was 290 mAh/g. This value corresponds to about 90% of the maximum capacity. Therefore, it can be concluded that the materials of the first group have long cyclic life without any pretreatments.

EXAMPLE 2

A series of electrodes composed of the materials belonging to the second group ($ZrCr_{1+y}Ni_{1+z}$) was fabricated and evaluated, with respect to the activation behaviors thereof by the same procedure as described in Example 1.

Figure 4:
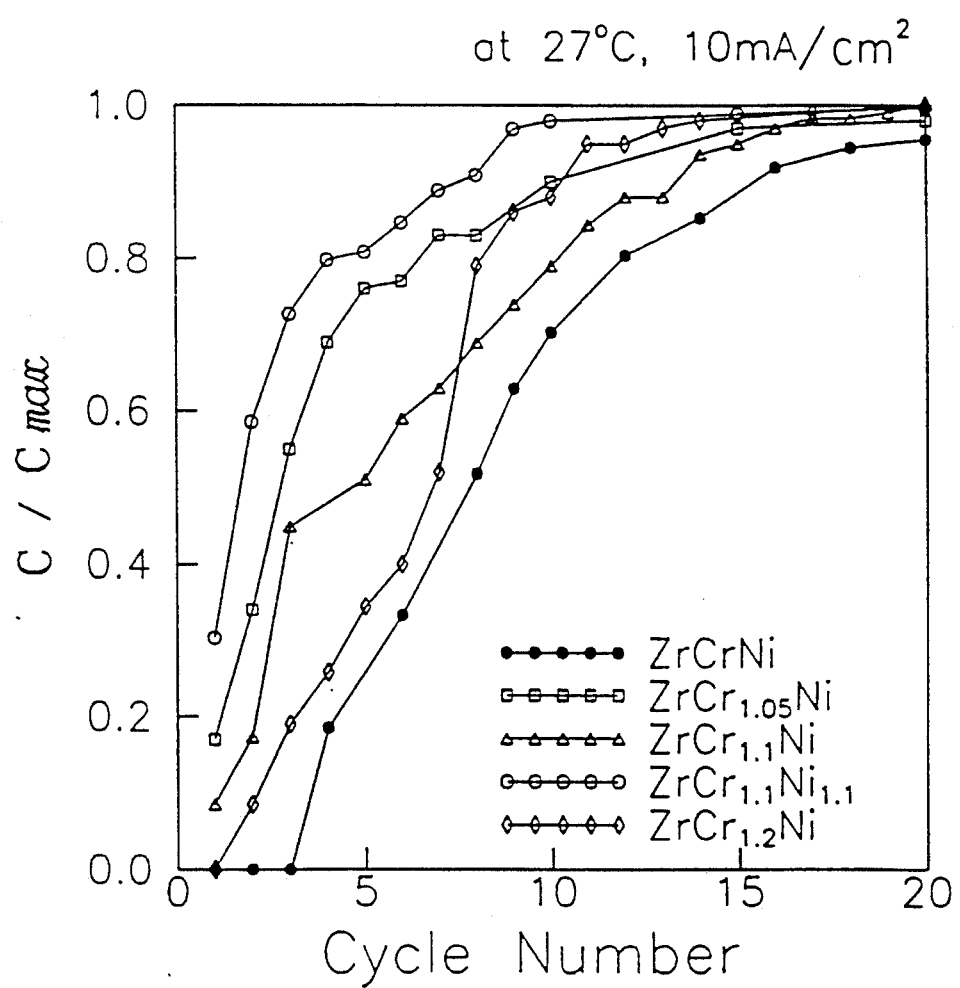
FIG. 4 is a graph showing the variations of $C/C_{max}$ of $ZrCr_{1+y}Ni_{1+z}$ ($0 \leq y \leq 0.2$, and $0 \leq z \leq 0.2$, provided that y and z cannot denote 0 concurrently) electrodes with the cycle number.

The activation behaviors of $ZrCr_{1+y}Ni_{1+z}$ alloys are shown in FIG. 4. The data shown in this figure indicate that the activations of the most electrodes were achieved after about 10 cycles of the charge/discharge cycling. From this result, it is confirmed that the $ZrCr_{1+y}Ni_{1+z}$ electrodes are far more easily activated than ZrCrNi electrodes.

Figure 5:
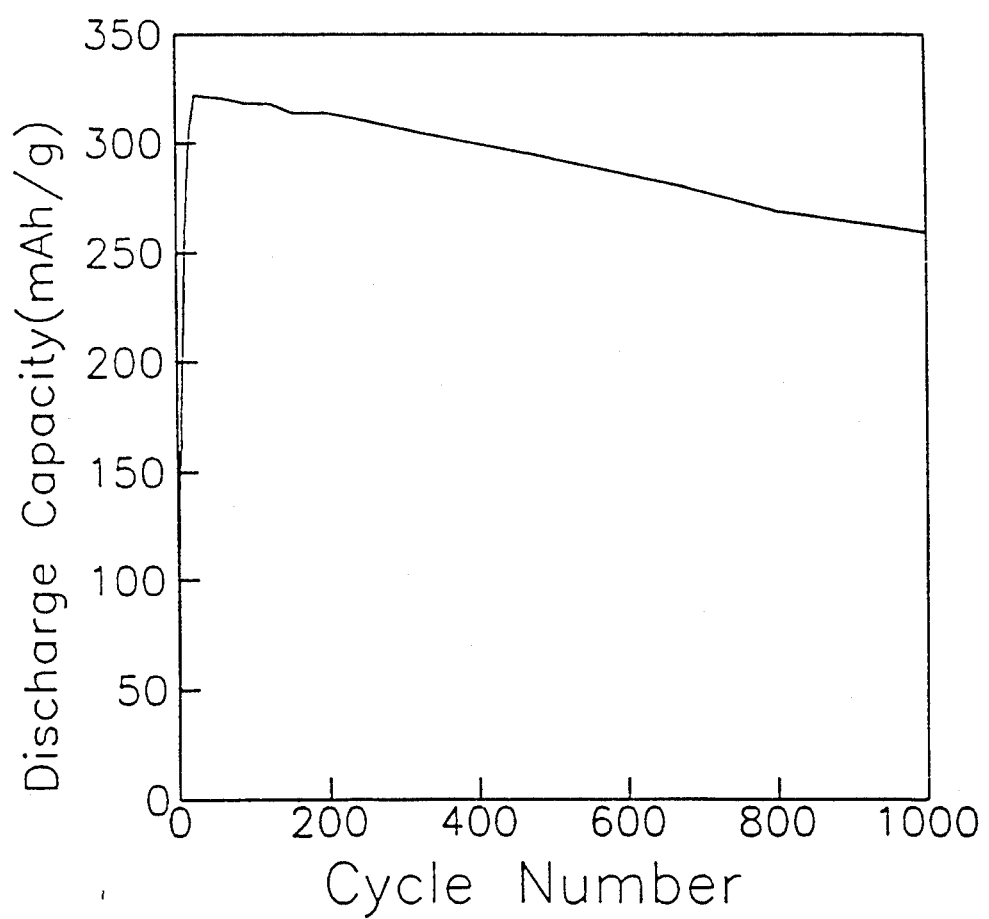
FIG. 5 is a graph showing the change of the discharge capacity of $ZrCr_{1.1}Ni_1$ electrodes with the extended charge/discharge cycling.

FIG. 5 shows the discharge capacity of $ZrCr_{1.1}Ni_1$ with the cycle number. After 1,000 cycles, the discharge capacity of this material decreased about 10% as compared with the initial value. A longer cyclic life of this alloy was attributed to the thin and dense Zr- and Cr-oxide films formed on the surface.

EXAMPLE 3

Another series of $ZrCrNiM_{0.05}$ and $ZrCr_{1+y}Ni_{1+z}$ (M=La, Mm, and Nd; $0 \leq y \leq 0.2$, and $0 \leq z \leq 0.2$, provided that y and z cannot denote 0 concurrently) alloys was prepared by the same procedure as described in Examples 1 and 2, and the electrochemical properties thereof were evaluated.

The electrochemical properties are shown in Table 1 below.

TABLE 1

| Alloys | $C_{act}$* | Discharge Capacity (mAh/g) | $C_{500}/C_{max}$** |
|---|---|---|---|
| $ZrCrNiLa_{0.05}$ | 2 | 320 | 0.9 |
| $ZrCrNiMm_{0.05}$ | 5 | 295 | 0.9 |
| $ZrCrNiNd_{0.05}$ | 3 | 295 | — |
| $ZrCr_{1.1}Ni$ | 12 | 322 | 0.95 |
| $ZrCr_{1.1}Ni_{1.1}$ | 8 | 290 | 0.92 |
| $ZrCr_{1.2}Ni$ | 9 | 300 | — |
| $ZrCrNi_{1.2}$ | 7 | 285 | — |

*$C_{act}$: the cycle number at $C/C_{max}$ (= 0.9)
**$C_{500}$: the discharge capacity after 500 charge/discharge cycles The data shown in Table 1 indicate that the Zr-based hydrogen storage materials of the invention exhibit improved activation behaviors as well as larger discharge capacities and longer cyclic life without conducting any pretreatments/ Therefore, an artisan can be convinced that the Zr-based hydrogen storage materials of the present invention are useful for the electrochemical applications.

What is claimed is:

1. A zirconium-based hydrogen storage material showing an improved activation behavior, which is represented by the following formula:

$$ZrCrNiM_x \qquad (I')$$

wherein M is a light rare earth metal selected from the group consisting of La, Nd, and Mm, Mm being a Misch metal comprising a mixture of rare earth elements; and $0 < x < 0.1$.

* * * * *